(12) United States Patent
Seba et al.

(10) Patent No.: US 12,085,011 B2
(45) Date of Patent: Sep. 10, 2024

(54) METHOD FOR OPERATING A SUPERCHARGED INTERNAL COMBUSTION ENGINE AND DEVICE FOR PROVIDING COMBUSTION AIR FOR A SUPERCHARGED INTERNAL COMBUSTION ENGINE

(71) Applicant: Liebherr Machines Bulle SA, Bulle (CH)

(72) Inventors: Bouzid Seba, Riaz (CH); Michael-Alexandre Baert, Murten (CH); Sandro Silvestrini, Canobbio (CH); Alix Noca, Fribourg (CH)

(73) Assignee: LIEBHERR MACHINES BULLE SA, Bulle (CH)

( * ) Notice: Subject to any disclaimer, the term of this patent is extended or adjusted under 35 U.S.C. 154(b) by 0 days.

(21) Appl. No.: 18/060,510

(22) Filed: Nov. 30, 2022

(65) Prior Publication Data

US 2023/0167764 A1 Jun. 1, 2023

(51) Int. Cl.
*F02B 21/00* (2006.01)
*F02D 41/00* (2006.01)
*F02M 31/04* (2006.01)
*F02M 35/112* (2006.01)
*F02M 35/116* (2006.01)

(52) U.S. Cl.
CPC .......... *F02B 21/00* (2013.01); *F02D 41/0007* (2013.01); *F02D 41/0082* (2013.01); *F02M 31/042* (2013.01); *F02M 35/112* (2013.01); *F02M 35/116* (2013.01)

(58) Field of Classification Search
CPC .......... F02B 21/00; F02B 37/10; F02B 29/00; F02B 33/443; F02B 33/44; F02B 37/04; F02D 41/0007; F02D 41/0082; F02D 13/06; F02D 17/02; F02D 41/0087; F02D 41/062; F02M 35/116; F02M 35/10045; F02M 35/108

See application file for complete search history.

(56) References Cited

U.S. PATENT DOCUMENTS

| | | | |
|---|---|---|---|
| 2010/0086414 A1 | 4/2010 | Tai | |
| 2011/0132335 A1* | 6/2011 | Pursifull | F02D 23/00 137/565.17 |
| 2011/0253111 A1* | 10/2011 | Pursifull | F02D 29/02 219/202 |
| 2013/0098337 A1* | 4/2013 | Carlson | F02B 75/04 123/48 R |

* cited by examiner

*Primary Examiner* — J. Todd Newton
(74) *Attorney, Agent, or Firm* — McCoy Russell LLP

(57) ABSTRACT

The disclosure relates to a method for operating a supercharged internal combustion engine having at least one cylinder group with a number n of combustion chambers, wherein, during a first operating state, all n combustion chambers are supplied with combustion air via a primary charge air path and, during a second operating state, only a portion of the n combustion chambers are supplied with combustion air from the primary charge air path and another portion of the n combustion chambers are supplied with combustion air from a separate compressed air reservoir.

10 Claims, 7 Drawing Sheets

METHOD FOR OPERATING A SUPERCHARGED INTERNAL COMBUSTION ENGINE AND DEVICE FOR PROVIDING COMBUSTION AIR FOR A SUPERCHARGED INTERNAL COMBUSTION ENGINE

CROSS-REFERENCE TO RELATED APPLICATION

The present application claims priority to Swiss Patent Application No. 070629/2021 filed on Dec. 1, 2021. The entire contents of the above-listed application are hereby incorporated by reference for all purposes.

TECHNICAL FIELD

The disclosure relates to a method for operating a supercharged internal combustion engine having at least one cylinder group with a number n of combustion chambers, and to a device for providing combustion air for a supercharged internal combustion engine.

BACKGROUND

The pursuit of higher efficiencies and greater performance densities for internal combustion engines has meant that for a long time almost all commercially used internal combustion engines have been supercharged. Exhaust gas turbochargers are most commonly used for this purpose. In the case of an internal combustion engine supercharged by means of an exhaust gas turbocharger, the generally known phenomenon of so-called 'turbo lag' occurs in a particularly pronounced form in an operating situation with comparatively low crankshaft speed and a strong increase in the power output requirement. A correspondingly rapid increase in the power output of an internal combustion engine is limited by the fact that the increase in energy conversion from one combustion process to the next can only be increased by a certain amount. As a rule, fuel is made available to today's internal combustion engines under a greatly or even extremely increased pressure.

SUMMARY

When using liquid fuels, from a technical point of view limited to fuel delivery alone, the volume of fuel supplied to the combustion chamber can be increased extremely quickly, even if, starting from a low load on the internal combustion engine, i.e. a small fuel supply rate, a full-load acceleration or a transient load application takes place. In comparison, there is a clear limitation for increasing the air supply rate into the combustion chambers.

The limiting effect of air delivery with regard to a potential increase in performance is more pronounced for the so-called 'supercharged' internal combustion engines, which in the traditional industrial nations have long since achieved a very clear dominance in terms of unit numbers in the commercial vehicle sector due to significantly higher efficiencies, which is equally evident in the new industrial nations and the so-called 'emerging countries'. To curb soot formation, a disproportionate increase in fuel supply compared to the available air volume is not possible, or is only possible to a small extent. Clearly, a sufficient air volume, or more precisely a sufficient oxygen volume, must be available in the combustion chamber so that complete combustion of the supplied fuel is possible in purely quantitative terms and an ignitable fuel-air mixture is also available. For an ignitable fuel-air mixture, however, the air component must not be too high. Depending on the type of fuel used, there is a certain range for the minimum fuel component up to a maximum fuel component in order to ensure a fuel-air mixture that has reliable ignition capability. When operating an internal combustion engine, this ratio, the so-called 'combustion air ratio', has a strong influence on the efficiency and also the maximum possible power output of the internal combustion engine. It also influences the level of hydrocarbon and nitrogen oxide emissions.

In order to achieve the criteria mentioned at the outset and the resulting advantages, the internal combustion engines are configured in such a way that the air volume required to deliver high power can only enter or be forced into the combustion chambers if the charge air compressor has a sufficiently high mechanical power available to be able to achieve a correspondingly strong compression of the air. In the case of exhaust gas turbochargers, the charge air compressor draws its power from the mechanical power provided by the exhaust gas turbine. Thus, in the case of an internal combustion engine equipped in this way, in the event of a transient increase in load and the associated need for a correspondingly immediate increase in power output, there is the problem that the charge air compressor does not initially have sufficient power available to force a sufficient volume of air, which would be necessary for a correspondingly high power conversion, into the combustion chambers. Instead of an immediate and rapid increase in power, only a delayed rise in power is possible.

As far as liquid fuels are concerned, if a carburetor is present, a very highly dynamic increase in the fuel supply rate can already be implemented from a purely technical point of view in systems of comparatively simply design. If a system for high-pressure fuel injection is present, a very highly dynamic increase in the fuel supply rate can likewise be implemented from a purely technical point of view. In a technical application, however, the increase in the fuel supply rate is not solely dependent on the fuel path, but must be limited depending on the dynamic limitations of the air path, including consideration of the applicable emission regulations. In order to achieve a quasi-complete combustion of the fuel and/or so that the combustion takes place within a narrow fuel-air ratio range, the fuel supply rate can also only be increased to a correspondingly small extent in those operating ranges of the internal combustion engine in which only a slow increase in the air supply is possible. Systems for the compression of charge air are already known which do not draw their power required for this purpose, at least not exclusively, from the currently arising exhaust gas energy.

FIG. 1 shows the prior art using the example of a six-cylinder in-line engine with single-stage supercharging via an ordinary exhaust gas turbocharger 1. The air path system is extended with a compressed air reservoir 2, a compressed air source 3 for generating compressed air, and three switching elements 4, 5, 6. Depending on the pressure level of the air volume available in the compressed air reservoir 2 and the volume ratios in relation to the internal volume of the compressed air reservoir and the corresponding air path of the internal combustion engine, a significantly increased air volume can be supplied to the air manifold 7 or the combustion chambers 8 by opening the valve 5 while their inlet valves are open, even after a very short response time. As long as the compressed air reservoir 2 has a correspondingly high air supply and a correspondingly sufficiently high pressure level exists, the valve 4 remains closed when the valve 5 is open, so that the air supplied to the supply system 7 for supplying air to the internal combustion engine comes exclusively from the compressed air reservoir 2. In order to be able to provide a significantly increased air volume for the internal combustion engine from this compressed air reservoir 2 whenever necessary, the compressed air reservoir 2 is recharged as soon as the air demand for supplying the internal combustion engine can be covered already by the capability of charge air compression emanating solely from the exhaust gas turbocharger 1. The boost system present here for supplying air to the internal combustion engine has the disadvantage that its use substitutes the main air supply system via the exhaust gas turbocharger 1, specifically for the case of a particularly high air demand. Consequently, in order to achieve a certain air supply increase in relation to the air mass flow and the air supply available for a boost process, a considerably larger system design of the boost system is required, which applies in particular to the compressed air reservoir 2, or, in the case of an existing installation space restriction, only results in a correspondingly reduced boost capability.

FIG. 2 shows a further exemplary prior art using the example of a six-cylinder in-line engine. With regard to the air path, the standard topology of a supercharged internal combustion engine is shown. In the event that the required air demand of the internal combustion engine cannot be covered solely by the exhaust gas turbocharger 1 operating in normal operation—i.e. the power that can be extracted from the current exhaust gas flow by means of the turbine of the exhaust gas turbocharger 1 is not sufficiently high to provide a sufficiently high charge air volume by means of the charge air compressor of the exhaust gas turbocharger 1—a temporarily limited increase in the air supply is possible. If a rapid increase in the power output of the internal combustion engine is required, the valve 5' is opened, whereby additional power is supplied to the turbine of the exhaust gas turbocharger 1, in addition to the exhaust gas flowing in from the exhaust gas collector 10, by means of the compressed air which can be drawn from the compressed air reservoir 2. This in turn leads to a significant increase in air compression by the exhaust gas turbocharger 1 within a short period of time, which allows a considerable increase in the air supply volume into the combustion chambers 8 within a short period of time, which can now be accompanied by an increase in the fuel supply volume.

Compared to the system shown in FIG. 1, the system shown in FIG. 2 has the advantage that the compressed air taken from the compressed air reservoir 2 contributes additively to the air supply of the internal combustion engine. However, a disadvantage of the system shown in FIG. 2 is that during the boost operation, comparatively cold compressed air taken from the compressed air reservoir 2 is mixed with the hot exhaust gas coming from the exhaust gas collector 10. As a result, a considerable amount of thermal energy in the exhaust gas can no longer be extracted by the turbine of the exhaust gas turbocharger 1.

Unless the design of the exhaust gas turbocharger 1 is such that the transfer of exhaust gas into the compressed air path is completely prevented, the entire gas flowing out of the exhaust gas turbocharger 1—consisting of the engine exhaust gas and the air taken from the compressed air reservoir 2—must be passed through an exhaust gas aftertreatment system. This leads to a considerable reduction in the exhaust gas temperature and thus to a considerable reduction in the effectiveness of the exhaust gas aftertreatment.

This can have the consequence that, taking into account the emissions present in real operation, a boost operation corresponding to FIG. 2 may only be used for a comparatively short period of time or may not be used at all at times, namely at a comparatively low engine temperature, which is clearly present immediately after an engine start after a longer period of standstill, but also after longer engine operation in the lower partial load range, which occurs very frequently in the field of mobile machines. In particular, the demand for a strong increase in power output starting from the situation that the internal combustion engine is operating in the lower partial load range represents the application case in which boost operation is to be used.

It is therefore the object of the present disclosure to provide an improved device and a method that allow a highly dynamic increase in the combustion air supplied to a supercharged internal combustion engine and thereby avoid the existing disadvantages of the systems described above.

The disclosure proposes a novel method for operating a supercharged internal combustion engine having at least one cylinder group with a number n of combustion chambers, wherein it is provided that, during a first operating state, all n combustion chambers of the cylinder group are supplied with combustion air from a primary charge air path. The primary charge air path is understood to be the path for predominantly providing the required charge air to the internal combustion engine. Usually, this is an air path with supercharging for the provision of compressed charge air. Supercharging in the primary charge air path can take place, for example, by means of a turbocharger, in particular by means of an exhaust gas turbocharger.

In accordance with the disclosure, it is now proposed to supply only a portion of the n combustion chambers with combustion air via the primary charge air path during a second operating state, in particular a so-called boost operation. By reducing the number of combustion chambers to be supplied, the latter can be supplied with an increased air volume and/or a higher charge air pressure from the primary charge air path. The portion of the n combustion chambers not supplied from the primary charge air path is instead supplied exclusively with the necessary combustion air from a separate compressed air reservoir during this second operating state.

Thus, according to the disclosure, for a second operating state, the charge air supply of the n combustion chambers is divided between at least two different air supply systems for providing combustion air. In the case of the previously known solution, in which the air supply to the combustion chambers via the regular air path is substituted during boost operation by providing the air supply to all active combustion chambers exclusively from the compressed air reservoir, the boost system must be designed to be correspondingly larger than in the system according to the disclosure. The reason for this is that, in contrast to the previously known solution, in the system according to the disclosure the supply from the compressed air reservoir acts in addition to the regular air supply to the combustion chambers.

The number n of combustion chambers may correspond to the total number of combustion chambers of the internal combustion engine. However, the number n may also correspond to the number of cylinders of a cylinder bank of the internal combustion engine, wherein n may correspond to the number of all cylinders of the cylinder bank or may only include a portion of the cylinders of a cylinder bank. Optionally, the n combustion chambers arranged in a bank are those arranged in the immediate vicinity of one another; for example in a common bank and thereby arranged in the immediate vicinity of one another. The air distribution can be carried out by means of associated and separate air manifolds. It is also conceivable that the n combustion chambers are divided over a plurality of cylinder banks, wherein the cylinders combined into a cylinder group may have the same positions in relation to their own particular bank.

The number n of combustion chambers may be even or odd. If the internal combustion engine according to the disclosure has an even number of combustion chambers, it may well make sense for the number of those combustion chambers which are supplied via the regular air path during boost operation to be greater than the number of combustion chambers supplied from the compressed air reservoir, specifically if, in the case of fully-capacity boost operation, there is an air demand of the combustion chambers which is significantly greater than twice the air demand during normal operation, i.e. the operation of the internal combustion engine with a deactivated boost system. If, on the other hand, there is only a moderately increased air demand of the combustion chambers for an application during boost operation, even under maximum load, it may make sense for the number of those combustion chambers that are supplied from the compressed air reservoir to be smaller than the number of those combustion chambers that always receive their air supply via the regular air path.

If a boost system according to the disclosure is to be used in such an internal combustion engine which has an even number of cylinders and which can be used either with operation of all combustion chambers or with operation of half of all combustion chambers, an advantageous mode of operation provides that in a first load range—starting from idling operation up to an output torque of approximately 40% full load—half of the cylinders are deactivated. If, during such an operation of the internal combustion engine, a high increase in the required power output occurs, for example because a high increase in the output torque is required in order to be able to maintain the current speed, an possible embodiment of the internal combustion engine according to the disclosure allows a continuation of the air supply to the already active cylinders via the regular air path and an additional activation of the previously deactivated cylinders, which then receive their combustion air from the compressed air reservoir. If the load of such an internal combustion engine is above this output torque threshold value of, for example, 40%, operation using all combustion chambers is intended. If the combustion air required to cover the power output including the power peaks can be provided via the regular air path, the boost system remains inactive. In the event of a correspondingly higher combustion air demand, a first portion of the combustion chambers is supplied via the regular air path and the remaining portion is supplied from the compressed air reservoir, just as in such an internal combustion engine according to the disclosure in which no cylinder deactivation is provided. If, in the case of the internal combustion engine according to the disclosure, which is equipped with the functionality of cylinder deactivation and which is already operated during an observation period using all combustion chambers, an increased power requirement occurs from a certain point in time, the air supply to the combustion chambers is divided in the same way as in the case of an internal combustion engine in which cylinder deactivation is not provided.

A further embodiment, which is explained by way of example using a 6-cylinder engine, provides that the internal combustion engine is operated with two cylinders in the lower load range, with four cylinders in a middle load range, and with all six cylinders in the upper load range. Optionally, such an internal combustion engine according to the disclosure has corresponding connections with regard to the combustion air supply, so that all combustion chambers can be supplied in pairs via the regular air path and, at the same time, the same pairs of combustion chambers can alternatively be supplied from their own or a common compressed air reservoir. Furthermore, said air connections between pairs of combustion chambers with the regular air path and the corresponding compressed air reservoir are each connected to a valve that can be actuated by an external control unit (for example, the control unit 36 in FIG. 4), wherein the control is designed in such a way that each pair of combustion chambers can obtain its combustion air either via the primary air path or from the common or individual compressed air reservoir.

Although it does not belong to the core of the disclosure, it should be mentioned that such an internal combustion engine according to the disclosure is optionally operated in the lower and in the middle load range using the commonly known so-called 'skip-firing' principle. Nevertheless, a brief exemplary explanation is given below: When used in the middle load range of such an exemplary 6-cylinder engine, the skip-firing principle provides that a first combustion chamber pair of the internal combustion engine is deactivated within a first period of time considered. Within a subsequent period, this first pair of combustion chambers is activated—i.e. the particular combustion chamber is supplied in the given crankshaft angle range with fuel, to which in turn, in the case of a spark-ignited internal combustion engine, the external ignition energy is supplied at the given ignition angle, so that the ignition of the fuel is triggered in each case—while a second pair of combustion chambers is inactive. In a third subsequent period, the first pair of combustion chambers remains active. The second pair of combustion chambers is activated at the beginning of this third period and remains active, while the third pair of combustion chambers is deactivated and remains inactive. At the beginning of a fourth period immediately following this, a repetition of the previously described procedure begins. As already mentioned, the inlet and outlet valves of a cylinder optionally remain permanently closed during its deactivation. Clearly, the skip-firing principle can also be applied if two combustion chamber pairs are deactivated, which is clearly preferred for an internal combustion engine according to the disclosure if a correspondingly middle load is present. During the operating phases of an internal combustion engine according to the disclosure, in which a portion of the combustion chambers is inactive, an event-related cyclical exchange of the disconnected combustion chambers can be carried out instead of a time-related one. In the case that, for example, two of the three combustion chamber pairs are to remain in active mode, a different pair of combustion chambers could be disconnected after a crankshaft angle of 720° has been passed through, optionally precisely the pair of combustion chambers that has already been deactivated for the longest. In the case that, for example, one of the three combustion chamber pairs is to remain in active mode, a different pair of combustion chambers could be connected after a crankshaft angle of 720° has been passed through, optionally precisely the pair of combustion chambers that has already been activated for the longest.

If there is a sudden sharp increase in the power demanded by an internal combustion engine according to the disclosure, which is currently operating in two-cylinder mode, all deactivated cylinders are clearly reactivated. In order that the high power output already demanded or required by the internal combustion engine can be provided as immediately as possible, the air supply according to the disclosure is optionally carried out on the two pairs of combustion chambers that were deactivated immediately beforehand.

If an internal combustion engine according to the disclosure has an even number n of combustion chambers, it may well make sense that during boost operation, the number of combustion chambers supplied via the regular air path is greater or smaller than the number of combustion chambers supplied from the compressed air reservoir.

In a possible embodiment of the internal combustion engine according to the disclosure, in the second operating state there is a symmetrical distribution of the n combustion chambers over both air supply systems, i.e. an identical number of combustion chambers is supplied with the required combustion air via the primary air path as from the compressed air reservoir. In this case, when the second operating state is present, these two air supply systems provide an ideally identical charge air pressure on the output side. Following this ideal case, without a limitation to a generalization in a specific load situation of the internal combustion engine, the air supply of a combustion chamber would be independent of whether it receives its combustion air via the regular air path or from the compressed air reservoir. Clearly, the latter is an idealization. On an application-relevant scale, the operating sequence or the engine behavior that can be experienced by the user with regard to the air supply should not be dependent on whether the air supply of a particular combustion chamber is provided via the regular air path or from the compressed air reservoir.

In an alternative embodiment of the internal combustion engine according to the disclosure, in the second operating state there is a symmetrical distribution of the n combustion chambers over both air supply systems, i.e. a different number of combustion chambers is supplied with combustion air via the primary air path as from the compressed air reservoir. Clearly, the corresponding circumstances also apply in the case of an air supply system configured in this way.

The first and second operating states can be differentiated by one or more different engine operating parameters or engine states. Optionally, a differentiation of the operating state relevant here is made on the basis of a difference between the current actual power output and the requested target power output of the internal combustion engine, wherein a transition to the second operating state is triggered if a corresponding increase in the target power output is detected and the internal pressure in the compressed air reservoir exceeds a certain pressure level. In one possible embodiment, the following criteria determine whether the engine remains in the existing operating state or assumes a different operating state:

the actual speed-torque value currently present at the crankshaft
the target speed of the crankshaft
the air pressure inside the compressed air reservoir As already explained at the outset, with an increasing target power output, an increased volume of fuel in combination with an increased volume of air is introduced into the combustion chambers. Due to the design, the short-term increase is limited at least for the charge air volume, especially in the case of a charge air path with exhaust gas turbocharger, keyword: turbo lag. If the volume of charge air required in the short term exceeds the volume of air that can only be provided in the short term by the primary charge air path, i.e. if the time gradient of the increase in the target power output is above a specific threshold value, then according to the disclosure there is a transition to the second operating state, whereby a first portion of the n combustion chambers receives its air supply along the primary charge air path and a second portion of the n combustion chambers is supplied from the compressed air reservoir. This concept makes it possible to provide an increased charge air volume almost without delay. In addition to the time-related increase in the demanded power output, i.e. the time gradient of the power output, the absolute value of the rise in the target power output compared to the current actual power output may also increase.

It is conceivable that the total of n combustion chambers are supplied with the required combustion air by two or a higher number of separate air manifolds. It is envisaged here that the charge air originating from the primary charge air path is branched in the first operating state to two or more separate paths for the parallel supply of the two or more air manifolds. In the second operating state, only a single air manifold or at least only a portion of the available charge air manifolds of the n combustion chambers is supplied with charge air by the primary charge air path. The other portion of the air manifolds is instead supplied with compressed air from the compressed air reservoir.

As has already been explained in detail above, it is conceivable to combine the method according to the disclosure together with a cylinder deactivation, in particular during low-load operation. In brief, when individual combustion chambers or a group consisting of a plurality of combustion chambers are deactivated, the remaining active combustion chambers can be supplied with combustion air as required via the primary charge air path and via an air supply from the compressed air reservoir.

It is conceivable to supercharge the compressed air reservoirs using a separate compressed air source. For example, a dedicated air compressor driven by a power take-off of the internal combustion engine can be used for this purpose. Such an air compressor can be connected to the compressed air reservoir via a valve arrangement in order to supply air to the compressed air reservoir when the currently present pressure level in the compressed air reservoir drops below a minimum threshold value. The air supply into the compressed air reservoir is sensibly limited by at least one termination criterion, for example until the reservoir pressure level has reached or exceeded a definable target threshold value. A supplementary termination criterion can be the occurrence of the situation that within a comparatively short period of time there is a correspondingly strongly pronounced increase in the air demand for supplying the combustion chambers of the internal combustion engine, which in the case of a particularly pronounced increase even leads to an air delivery being demanded from the compressed air reservoir, although the latter is not yet supercharged up to the corresponding threshold value, which would trigger the disconnection of the air supply into the compressed air reservoir.

Alternatively or additionally, the compressed air reservoir can also be supercharged with air provided from the primary charge air path. If the compressed air reservoir can be supercharged from the primary charge air path and a separate compressed air source, it can be provided that supercharging of the compressed air reservoir via the primary charge air path only takes place in a lower pressure range, while supercharging of the compressed air reservoir via the separate compressed air source takes place until at least one termination criterion, in particular the target threshold value of the reservoir internal pressure, is reached or exceeded.

According to an embodiment, not only is the air volume or the air pressure provided from the compressed air reservoir controlled in an open-loop or closed-loop fashion in the second operating state, but in addition a coordinated influence on the air supply through the primary and secondary air path into the combustion chamber groups can be possible by means of an actuator system controlled in an open-loop or closed-loop fashion. The aim is in particular to provide coordinated pressure levels in the primary and secondary charge air paths. The secondary air path refers to the air supply which is provided by taking compressed air from the compressed air reservoir. The primary charge air path can have a single-stage or multi-stage compression, wherein at least one compressor stage is actuatable. Actuatability can be achieved, for example, by using a charge air compressor which can be operated at a variable speed which can be pre-set by means of an open-loop and/or closed-loop control arrangement. A combination of a compressor of an exhaust gas turbocharger with a downstream second variably operable charge air compressor is conceivable. The latter can be adjustable as required by means of an open-loop or closed-loop control arrangement. Specifically, the use of an electrically driven charge air compressor is proposed, which is integrated into the primary charge air path downstream of the compressor of the exhaust gas turbocharger.

According to an advantageous modification of the method, the air stored in the compressed air reservoir can be heated, in particular preheated to a defined temperature level, if required using a suitable heating device. When this preheated air is available for a cold start, the so-called 'cold-start capability' can be significantly improved. The use of a suitable heating device for heating the stored air is conceivable.

It is particularly advantageous to provide compressed air in the compressed air reservoir at an increased temperature level during a cold start of the internal combustion engine. Against this background, it is advantageous if, during a third operating state, in particular during a cold start of the internal combustion engine, only those combustion chambers of the n combustion chambers, that draw their combustion air from the compressed air reservoir are supplied with fuel. It is therefore proposed, in the third operating state, to supply at least some of the n combustion chambers with combustion air from the compressed air reservoir. Furthermore, fuel is then to be supplied only to these combustion chambers supplied from the compressed air reservoir; the remaining portion of the n combustion chambers consequently remains inactive in the third operating state.

In accordance with the disclosure, it is proposed that such a device comprises two or more separate air manifolds and that a superchargeable primary charge air path is provided for supplying the n combustion chambers with the required combustion air. In addition thereto, at least one compressed air reservoir is provided in accordance with the disclosure. By means of an integral valve arrangement of the device, it is possible to selectively allow a charge air supply into at least one of the two or more air manifolds only through the primary charge air path or alternatively to allow a charge air supply via the primary charge air path only to a portion of the air manifolds, while the remaining portion or a group of the remaining portion of the air manifolds is supplied with combustion air taken from the compressed air reservoir. It is particularly advantageous if the device has an open-loop or closed-loop control arrangement which is configured in such a way as to be able to implement the method according to the disclosure as described above. Accordingly, the advantages and properties of the device correspond to the aforementioned explanations, and therefore a repetitive description is omitted at this juncture.

It is conceivable, for example, that the compressed air reservoir is connected to at least one of the air manifolds via at least one control valve, which is referred to as a compressed air control valve in the following text. By means of the compressed air control valve, it can be decided whether combustion air is delivered from the compressed air reservoir into one of the air manifolds or whether the fluid connection remains completely blocked instead, whereby in that second case the n combustion chambers are supplied exclusively via the primary charge air path. It is also conceivable to use a proportional valve as a compressed air control valve in order to be able to draw a demand-based air mass flow from the compressed air reservoir. In particular, such a compressed air control valve is actuatable externally via an interface, in particular by the proposed control arrangement for carrying out the method.

It is also conceivable that the primary charge air path, in particular downstream of a charge air cooler, is permanently fluidically connected to at least one or a portion of the air manifolds. Instead, the primary charge air path is connected to the remaining portion of the air manifolds via at least one control valve, which is referred to in the following text as a charge air control valve, in order to be able to adjust the volume of air delivered from the primary charge air path to the remaining portion of the air manifolds, optionally in a variable manner, or completely prevent it. A direct connection between the charge air control valve and the compressed air control valve is conceivable. In the simplest case, the charge air control valve can be configured as a simple non-return valve, in particular as a passive non-return valve. In the case of a charge air control valve configured as a passive non-return valve, its dimensioning is optionally selected such, that an opening of the compressed air control valve triggers the closing of the charge air control valve. In particular, the pressure increase generated by the opening of the compressed air control valve in the relevant line portion of the air path causes automatic closing of the charge air control valve, whereby air is supplied to the air manifolds connected to the compressed air reservoir exclusively from the compressed air reservoir. If, instead, the fluid connection to the compressed air reservoir is closed by means of the compressed air control valve, the charge air control valve configured as a passive non-return valve opens completely so that air can be supplied to all charge air manifolds from the primary charge air path. It should also be noted that the compressed air control valve is clearly only intended to open if there is a sufficiently high pressure level in the compressed air reservoir.

As already indicated at the outset, the compressed air reservoir can be supercharged via a separate compressed air source. A dedicated air compressor may be provided for this purpose. The air compressor can be driven via a power take-off of the internal combustion engine. The air compressor can also be connected to the compressed air reservoir via a valve arrangement to allow controlled supercharging of the reservoir by means of the air compressor.

Likewise, it may be provided that the device provides a multi-stage compression in the primary charge air path, in particular an exhaust gas turbocharger arranged first in the direction of flow, which generates a first stage of compression of the charge air. Downstream of the exhaust gas turbocharger, at least one additional charge air compressor can be connected downstream, in particular an electrically driven charge air compressor. At least one charge air cooler can be integrated between two charge air compressors. It is also conceivable that at least one charge air cooler is integrated downstream of the multi-stage compression.

In addition to the device according to the disclosure, the disclosure relates to an internal combustion engine comprising a corresponding device according to the disclosure. The above explanations of the device apply equally to the internal combustion engine, and therefore a supplementary description of the internal combustion engine is unnecessary at this juncture.

It is also conceivable that the internal combustion engine comprises a plurality of combustion chamber groups, each with a number n of combustion chambers, for example cylinder groups each with n combustion chambers arranged in a bank or in optionally adjacent positions of two banks. Each of these combustion chamber groups can then comprise a device according to the disclosure, i.e. a separate primary charge air path with independent supercharging is available for each combustion chamber group. In addition, a separate compressed air reservoir can be provided for each combustion chamber group. However, it is also conceivable at this juncture to use a compressed air reservoir jointly for a plurality of combustion chamber groups. For each combustion chamber group, the method according to the disclosure can be carried out by means of the separate devices independently of each other. However, a superordinate open-loop or closed-loop control arrangement for all devices used on an internal combustion engine may be used.

If the internal combustion engine comprises devices according to the disclosure having at least two separate compressed air reservoirs, it is convenient that the compressed air reservoirs of the at least two devices can be supercharged by a common external pressure source, in particular a common air compressor.

The application also covers a higher-level system in which an internal combustion engine according to the disclosure is used. The applications here can be mobile, stationary and portable. For example, a mobile application may be a road vehicle, an off-highway application, a water vehicle or an aircraft.

BRIEF DESCRIPTION OF THE FIGURES

Further advantages and features of the disclosure will be explained in greater detail below with reference to an exemplary embodiment shown in the figures, in which.

DETAILED DESCRIPTION

A method or a device for increasing the dynamics of an internal combustion engine represents an essential core aspect of the disclosure. An important component of the disclosure is at least one additional compressed air reservoir from which combustion air can be supplied to the combustion chambers temporarily and additively to the primary charge air path. In the event of a requirement for a correspondingly strongly pronounced increase in the target power output of the internal combustion engine—more precisely expressed in the event of a correspondingly strong level increase in the target power output in the presence of a large time gradient—a boost process takes place to better overcome the so-called 'turbo lag', in which compressed air is taken from the compressed air reservoir and is used as additional charge air, i.e. Is added to the charge air flowing in via the regular (primary) air path. The volume of the increased air supply into the combustion chambers is matched by an increase in fuel supply.

The core of the disclosure is evident in the overall topology of the air path at the component level. The arrangement of a topology according to the disclosure has the effect that the compressed air provided during a boost process is already directly supplied to the combustion; however, in doing so, it is only supplied to a portion of the existing combustion chambers of the internal combustion engine, whereas the remaining others or a portion of the remaining combustion chambers continue to receive their charge air via the regular air path, i.e. the air path on which the charge air compressor of the exhaust gas turbocharger acts.

This offers the great advantage that, even during a boost process, in which the total air supply to the combustion chambers is supported by taking compressed air from the compressed air reservoir, the currently available air mass flow, which is available via the regular air path, can continue to be used and at the same time the air volume taken additionally from the compressed air reservoir can be fed directly into the relevant combustion chambers of the internal combustion engine, i.e. it can already be used additively on the air side and thus the turbine of the exhaust gas turbocharger can immediately draw a higher energy volume from the exhaust gas.

Figure 3:
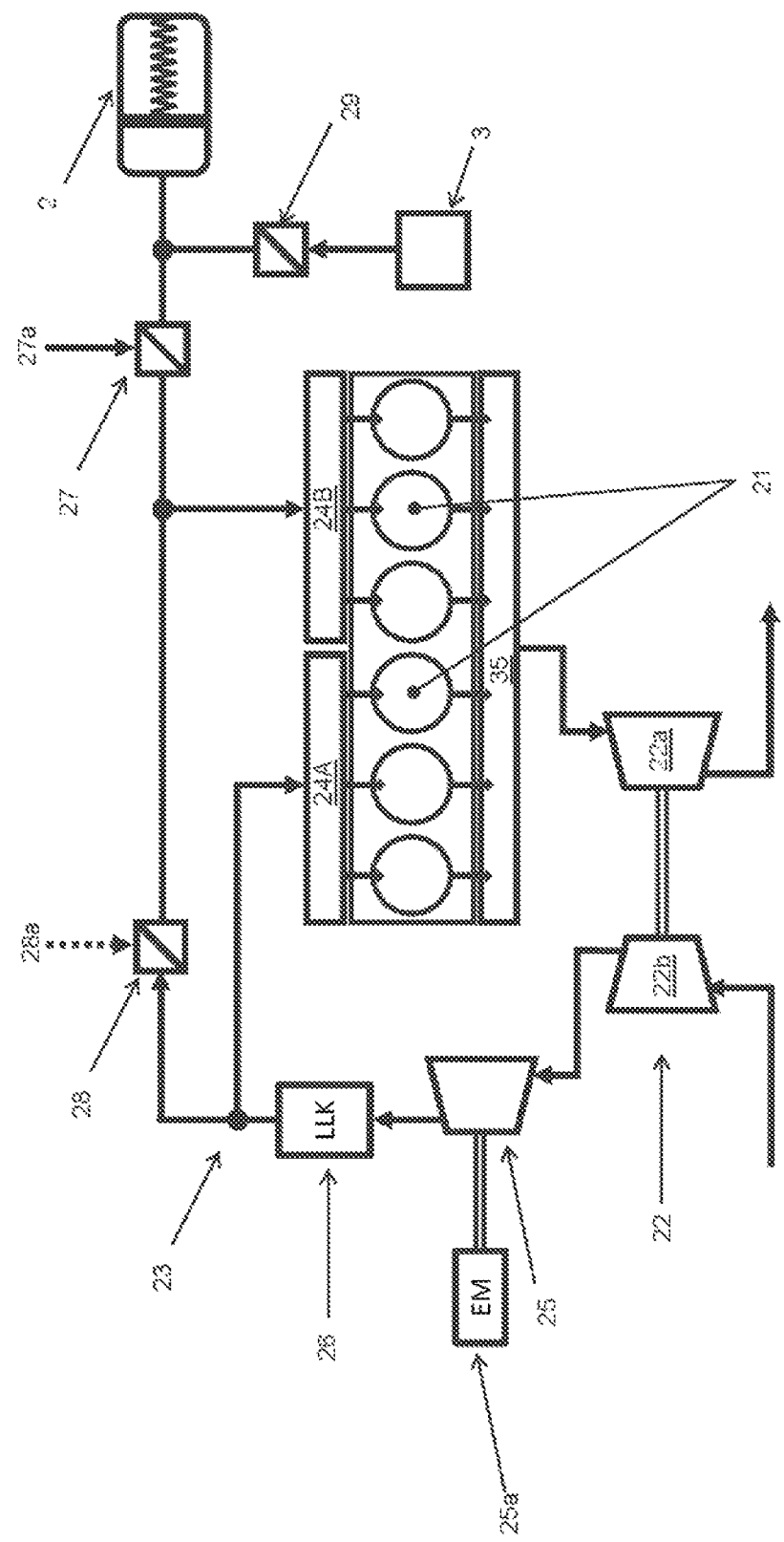
FIG. 3: shows a first exemplary embodiment of an internal combustion engine according to the disclosure.
Figure 4:
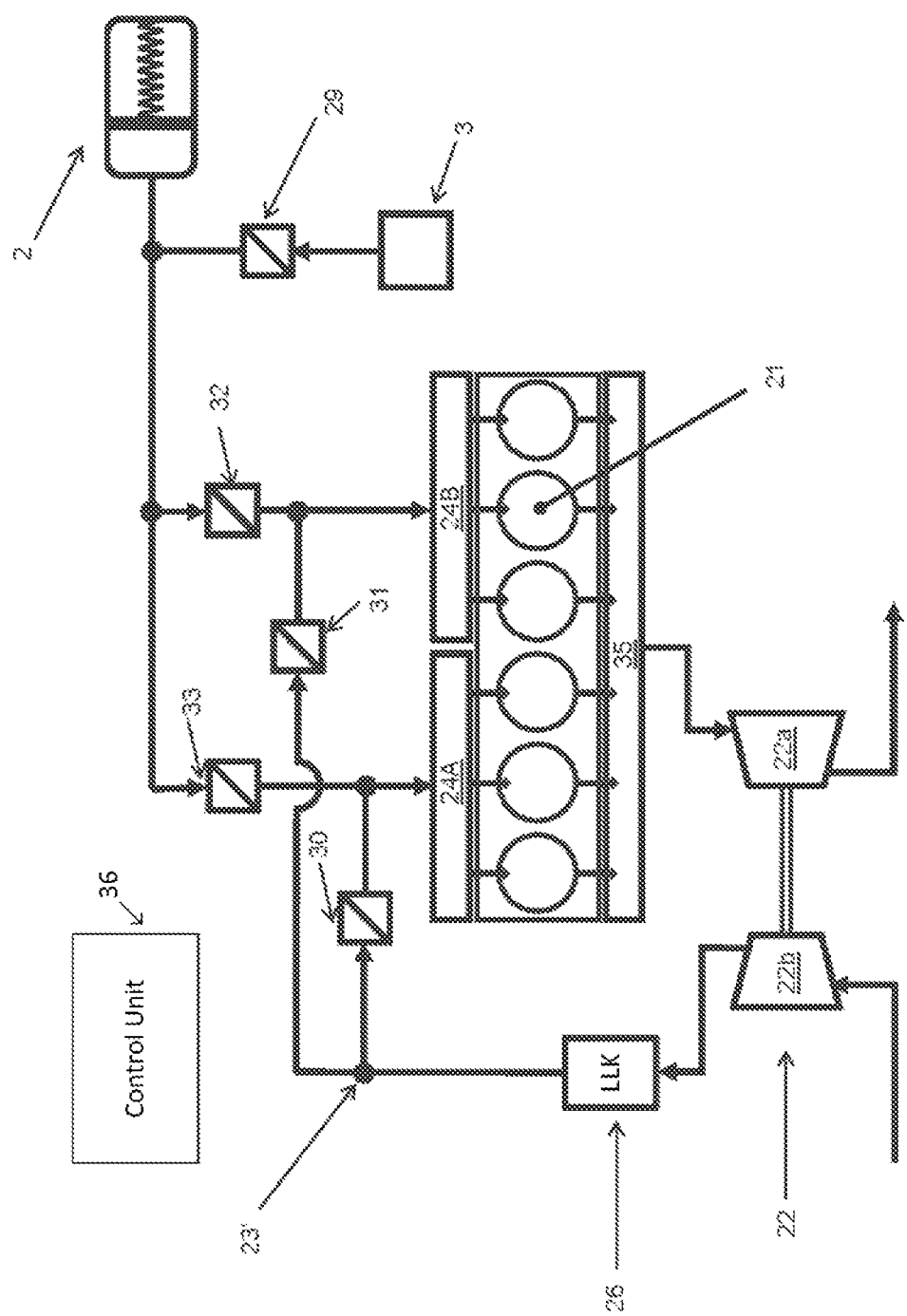
FIG. 4: shows a second exemplary embodiment of an internal combustion engine according to the disclosure.

The specific exemplary embodiment of FIGS. 3, 4 shows a six-cylinder in-line engine as an example. In a simple embodiment, it is an internal combustion engine supercharged in a single stage by means of an exhaust gas turbocharger 22. The exhaust gas turbocharger 22 comprises a turbine 22a which is driven by the exhaust gas supplied from the exhaust gas collector 35. The mechanical power available as a result drives the charge air compressor 22b. A split 23, 23' of the air path extending via the charge air compressor 22b ensures that a group of combustion chambers 21 is supplied with air via separate air manifolds 24A and 24B. The provision of charge air via the charge air compressor 22b is understood as a primary charge air path or regular charge air path in the exemplary embodiment shown.

In a basic consideration of the disclosure, the second charge air compressor 25 shown in FIG. 3 can be disregarded. Detailed explanations will be provided later in the context of a modified exemplary embodiment. If an additional second charge air compressor 25 is not provided, the upper pressure side of the charge air compressor 22b of the exhaust gas turbocharger 22 is connected to the inlet of the charge air cooler 26 with regard to the air path. In the case of a closed compressed air control valve 27, the air supply of the activated combustion chambers 21 takes place exclusively via the charge air compressor 22b, wherein it is provided in a possible embodiment of the disclosure that the charge air control valve 28 is permanently open during normal operation of the internal combustion engine. Therefore, in a simple embodiment, this can be configured as a passive non-return valve which, in the event of a higher pressure on its right-hand side compared to its left-hand side, blocks the air path extending from the charge air compressor 22b to the air manifold 24B and otherwise releases this air path.

In an alternative embodiment, which, however, is not the central focus of the disclosure, the charge air control valve 28 can be externally controllable via an optional interface 28a. Such an external actuation means 28a may allow the closing of the charge air control valve 28 even if there is no positive pressure on the right side thereof. However, the use of such a valve type may be used which, in the event of an overpressure prevailing on the right-hand side of the charge air control valve 28 compared to the pressure level prevailing on the left-hand side, closes automatically and remains closed until the pressure level on the right-hand side falls below a value which is slightly greater than that of the pressure level on the left-hand side. In particular, such an embodiment of the charge air control valve 28 which closes within the shortest possible time when a pressure wave with a correspondingly strongly pronounced pressure level arrives on the right side may be used.

Optionally, the device according to the disclosure is configured in such a way that, when the charge air control valve 28 is open, the air distribution between the individual air manifolds 24A, 24B and between the combustion chambers 21 is as uniform as possible. More precisely, the device according to the disclosure could optionally be configured accordingly in such a way that, when a charge air control valve 28 is open and a compressed air control valve 27 is closed, the air supply to a combustion chamber is independent of whether it receives its combustion air via the air manifold 24A or 24B, provided that all other influencing parameters are the same, such as the air valve control times, the pressure of the charge air at the charge air outlet of the exhaust gas turbocharger, etc.

If the load profile to be produced by the internal combustion engine has a comparatively low dynamic and no supercharging of the compressed air reservoir 2 using the charge air compressor 22b is currently or generally intended, the compressed air control valve 27 remains closed. The right-hand port of the compressed air control valve 27 is connected to a compressed air reservoir 2. Alternatively or additionally, the compressed air reservoir 2 can be supercharged via a compressed air source 3, for example an air compressor. The compressed air source 3 is connected to the compressed air reservoir 2 via a non-return valve 29. An air supply from the compressed air source 3 is provided when the pressure level in the compressed air reservoir 2 has fallen below a certain threshold value S1 and continues until a certain threshold value S2 has been reached.

The compressed air control valve 27 is opened and closed remotely via the control interface 27a and is determined via a control system. In the event of a failure of the control signal for the compressed air control valve 27, this should close and remain permanently closed.

If a correspondingly fast increase in power output by a correspondingly high absolute amount is demanded from the internal combustion engine, the intervention of the system according to the disclosure causes an increased dynamic for an increase in its power output, wherein this dynamic increase is dependent on the currently present speed-torque operating point. Using the system according to the disclosure, a very clear approximation to the setpoint of the speed-torque trajectory curve is achieved even in the case of demanded power increases that are extremely difficult or virtually impossible to fulfil.

The presence of a correspondingly strongly pronounced time gradient of the target power output by a correspondingly high absolute amount causes the compressed air control valve 27 to open. This in turn triggers a pressure wave that reaches the charge air control valve 28, causing it to close. As a result, the charge air provided via the regular air path only reaches the three left combustion chambers 21 shown here, which are connected to the air manifold 24A, whereas the three right combustion chambers 21 obtain their charge air exclusively from the compressed air reservoir 2 via the air manifold 24B. Such an option allows a very significant increase in the air supply to the combustion chambers 21 of the internal combustion engine, moreover within a very short reaction time.

In an embodiment, a compressed air control valve 27 is located within the air path from the compressed air reservoir 2 and is configured in particular as a controllable compressed air control valve 27 or is embedded in a control circuit. Based on this, the system can be configured to distribute air as evenly as possible between the two air manifolds 24A, 24B and thus the corresponding combustion chamber groups. An air supply that ideally has the same volume for each combustion chamber 21 in relation to the cycle clearly only results in stationary operation of the internal combustion engine.

In order to be able to use the possibility of a quasi abrupt rise to a very significantly increased air supply volume to achieve a desired dynamic increase in the power output of an internal combustion engine, the engine must be equipped with a fuel supply system that allows a correspondingly dynamic increase in the fuel supply rate.

As already indicated above, the second charge air compressor 25 shown in FIG. 3 acting as a further compressor stage is merely optional. In the case of two-stage supercharging, the primary air path—as shown in FIG. 3—can have a so-called intercooler (not present in FIG. 3) in relation to the air flow direction between the first charge air compressor 22b and the second charge air compressor 25, wherein the supply of cooling power or the dissipation of waste heat takes place as required. The second charge air compressor 25 can be driven, for example, by means of an electric motor 25a.

If the internal combustion engine operates in a low to middle load operation and with comparatively low dynamics, the air to the n combustion chambers 21 is optionally supplied using only the charge air compressor 22b of the exhaust gas turbocharger 22. Of course, a temporary bypass of the compression stage of the charge air compressor 25 is fluidically advantageous if the charge air required by the internal combustion engine can already be provided using only the charge air compressor 22b. For the sake of simplicity, the bypass is not shown in the circuit diagram in FIG. 3.

In the case of briefly occurring power peaks demanded by the internal combustion engine, depending on the time gradient and the amplitude of a particular power peak as well as depending on the system designs of the charge air compressor 25, operable according to the requirements, and of the device with which an increase in the air supply into the combustion chambers 21 of the internal combustion engine is possible by means of a compressed air withdrawal from the compressed air reservoir 2, one of these two boost systems or both boost systems ([a] the charge air compressor 25 operable according to the requirements and [b] the system which allows an increase in the air supply volume into the combustion chambers 21 of the internal combustion engine by means of a compressed air withdrawal from the compressed air reservoir 2) is used in order to achieve a shorter rise time of the power output of the internal combustion engine by means of an increase in the fuel injection volume thus possible or admissible. The same applies if there is a correspondingly strongly pronounced time gradient of the power output of the internal combustion engine in order to be able to provide a correspondingly increased level of its power output in the short term in accordance with the target specification.

As can be seen in FIG. 3, in this exemplary embodiment the compressed air which can be taken from the compressed air reservoir 2 can be supplied only to the three combustion chambers 21 arranged on the right-hand side, whereas the common air supply via the charge air compressor 22b of the exhaust gas turbocharger 22 and the charge air compressor 25 operable according to the requirements can be supplied to all combustion chambers 21 or alternatively to the three left-hand combustion chambers 21, which can be reached via the air manifold 24a. Accordingly, in an advantageous configuration—naturally assuming a charged compressed air reservoir 2—starting from the compressed air reservoir 2, an air supply to the three combustion chambers 21 arranged on the right-hand side is possible which is approximately of the same magnitude as the air supply to the three combustion chambers 21 arranged on the left-hand side by a joint use of the exhaust gas turbocharger 22 and of the second charge air compressor 25, which is operable according to the requirements. Alternatively or additionally, in an advantageous configuration, within a range of the power output of the internal combustion engine in which the predominant or the clearly predominant energy conversion of the internal combustion engine is present, the air supply of the combustion chambers 21 can be covered with respect to an operation with a moderate dynamic using the exhaust gas turbocharger 22 alone. Alternatively or additionally, in an advantageous configuration, the air supply to the combustion chambers 21, which is required over a longer period of time—starting from an order of magnitude of, for example, 10 seconds up to continuous operation—can be covered with simultaneous use of the exhaust gas turbocharger 22 and of the charge air compressor 25, which is operable according to the requirements.

If the engine application envisages operation of the electrically driven charge air compressor 25 also outside of short acceleration processes, it makes sense to integrate a so-called 'intercooler' in the primary air path, i.e. a cooler through which the charge air flow passes after leaving the compressor 22b of the exhaust gas turbocharger 22 and before flowing into the externally driven charge air compressor 25.

Such an overall system, in which the air supply to the combustion chambers 21—as described above—is staggered in three parts, offers the advantage that the exhaust gas turbocharger 22 and the additionally connectable charge air compressor 25 operate within a restricted operating range and can accordingly be designed more favorably and/or are operated collectively under a higher efficiency. Within a certain range (i) in relation to the level of the air mass flow required to support the exhaust gas turbocharger 22 and (ii) up to a certain duration of this support, this can be operated optionally using the second charge air compressor 25, which is operable according to the requirements, and/or the compressed air which can be drawn from the compressed air reservoir 2. The degree of freedom that exists here offers a certain potential for optimization which, taking into account one or more different aspects, makes a selection as to whether short-term support of the exhaust gas turbocharger 22 for supplying air to the combustion chambers 21 is to be provided by using the second charge air compressor 25, which is operable according to the requirements, or the compressed air that can be drawn from the compressed air reservoir 2 or a certain division between these two systems with regard to air supply. Possible criteria for such a division are, without claiming to be exhaustive, an energy consideration, a wear consideration, etc. In the simplest case, such considerations can be made on the basis of an estimated constant value, in a somewhat differentiated consideration by means of a characteristic diagram or by means of a so-called cost function, which in an embodiment even takes into account component ageing or an extrapolated remaining component service life.

The boost system according to the disclosure can also advantageously be used for an internal combustion engine which is appropriately equipped to allow deactivation of a cylinder group containing at least one cylinder during its partial load operation. An exemplary embodiment configured for this purpose is shown in FIG. 4. Here too, as in FIG. 3, the principle is explained on the basis of a 6-cylinder in-line engine. Components that are functionally identical in terms of their effect on the overall system are marked by identical reference signs in FIGS. 3 and 4.

The internal combustion engine of FIG. 4 also has two separate air manifolds 24A and 24B. If the internal combustion engine has already been operated in the upper load range for a considerable time, the two charge air control valves 30 and 31 are open, so that downstream of the charge air compressor 22b a split 23' of the charge air flow into two partial flows takes place, but all combustion chambers 21 are nevertheless supplied exclusively by the air compressed via the charge air compressor 22b of the exhaust gas turbocharger 22. In a lower partial load operation of the internal combustion engine, there is a corresponding position of the charge air control valves 30 and 31 (only one of the charge air control valves 30, 31 is open), in which the charge air reaches either those combustion chambers 21 that are accessible via the air manifold 24A or those combustion chambers 21 that are accessible via the air manifold 24B. The compressed air control valves 32 and 33 remain closed. The intake and exhaust valves of the deactivated cylinders 21 may remain permanently closed for the duration of that cylinder deactivation. If necessary, the compressed air source 3 is used to feed air into the compressed air reservoir 2 until a certain pressure level has been reached therein.

Based on the operating situation that the charge air control valve 30 is open and the charge air control valve 31 is closed and consequently only the left three cylinders are active whereas the right three cylinders are deactivated, there is now a sharp rise in the target power output of the internal combustion engine. As soon as the strong rise in the target power output is detected in a corresponding evaluation unit, the compressed air control valve 32 is opened via a corresponding actuator and the three remaining cylinders are activated, i.e. the fuel supply and the valve movements of the inlet and outlet valves are activated, while the valve position of the charge air control valves 30 and 31 is maintained. As already mentioned, this results in an addition of the two air volumes. The supply path of the first air volume runs via the charge air compressor 22b extending through the air manifold 24A into the combustion chambers 21 accessible via said manifold. Via the second air path, which is completely separate from the first air path under the premise of the position of the charge air control valves 30, 31 and of the compressed air control valves 32, 33 mentioned here, air originating from the compressed air reservoir 2 reaches the combustion chambers 21 of the internal combustion engine accessible via the air manifold 24B. Due to the design of the exemplary embodiment according to FIG. 4, there is a valve position of the charge air control valves 30, 31 and compressed air control valves 32, 33 by which, as an alternative to the foregoing, a modified constellation exists, in which the charge air provided via the charge air compressor 22b of the exhaust gas turbocharger 22 can be supplied exclusively to the combustion chambers 21 connected via the air manifold 24B and an exclusive inflow of the air which can be taken from the compressed air reservoir 2 into the combustion chambers 21 connected via the air manifold 24A is possible.

With regard to the basic functionality, there is no need for a crosswise exchange of the combustion chamber groups supplied via the charge air compressor 22b and of the combustion chamber groups supplied via the compressed air reservoir 2 for a use of the system solution according to the disclosure. In the application, during partial load operation, in which only a portion of the cylinders 21 is operated, a regular exchange of the operating mode (i) cylinders with fuel supply present and (ii) deactivated fuel supply is advisable, since otherwise many such loads, which lead to ageing of the engine components, are less distributed, but rather more focused on certain partial areas of the combustion engine, which is equally reflected in the component wear. Another significant advantage of this mode of operation is that the operating temperature of the cylinders that are deactivated is at least approximately maintained.

Figure 5:
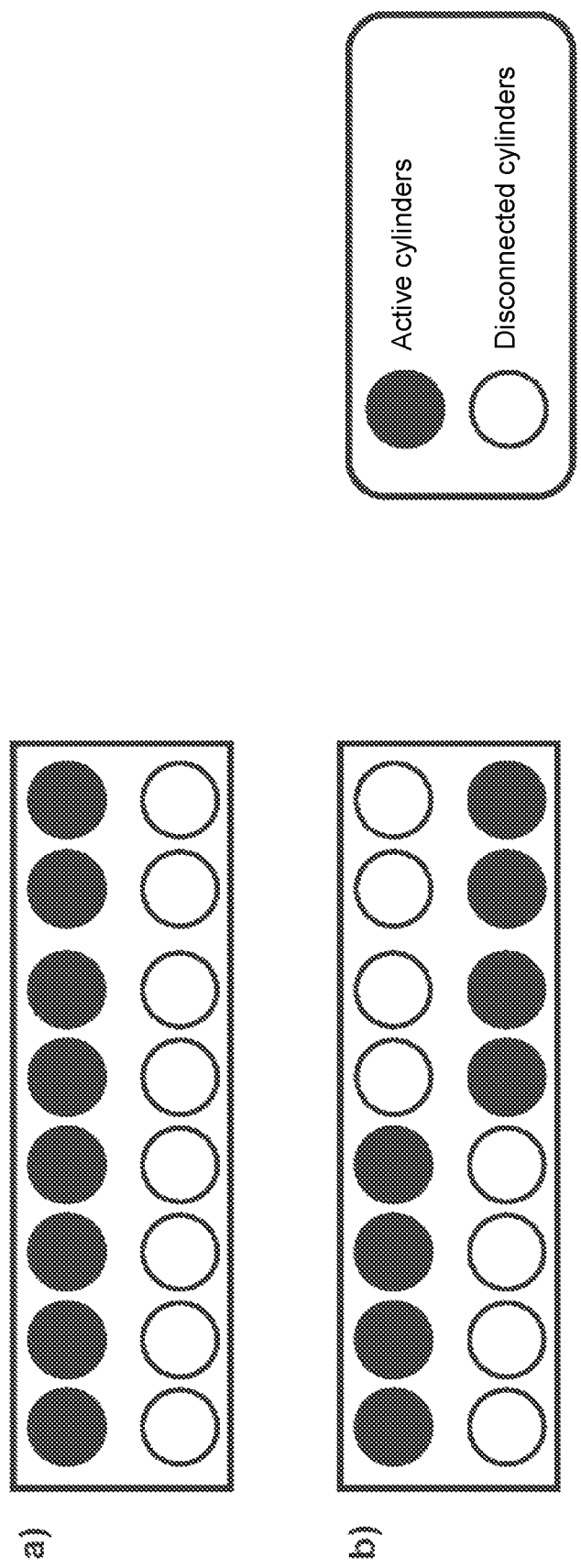
FIG. 5: shows a schematic representation illustrating the combination of the method according to the disclosure with a possible cylinder deactivation.

For clarification of the aforementioned cylinder deactivation, please refer to the schematic diagram in FIG. 5. The principle of cylinder deactivation is shown here on the basis of a V16 internal combustion engine. Sensible deactivation patterns of the combustion chambers are shown here under a) and b). In the first example a), all cylinders of one bank remain active, while the second cylinder bank is completely deactivated. However, according to the second example b), it may also be useful to deactivate cylinders of both the first and the second cylinder bank, wherein here specifically the first four cylinders of the first bank remain active while cylinders 5 to 8 are deactivated. For the second bank, the cylinders 1 to 4 are deactivated instead, while cylinders 5 to 8 remain active. The deactivation patterns explained above assumed a suitable crankshaft spider (crank) in conjunction with a suitable firing sequence.

Figure 6:
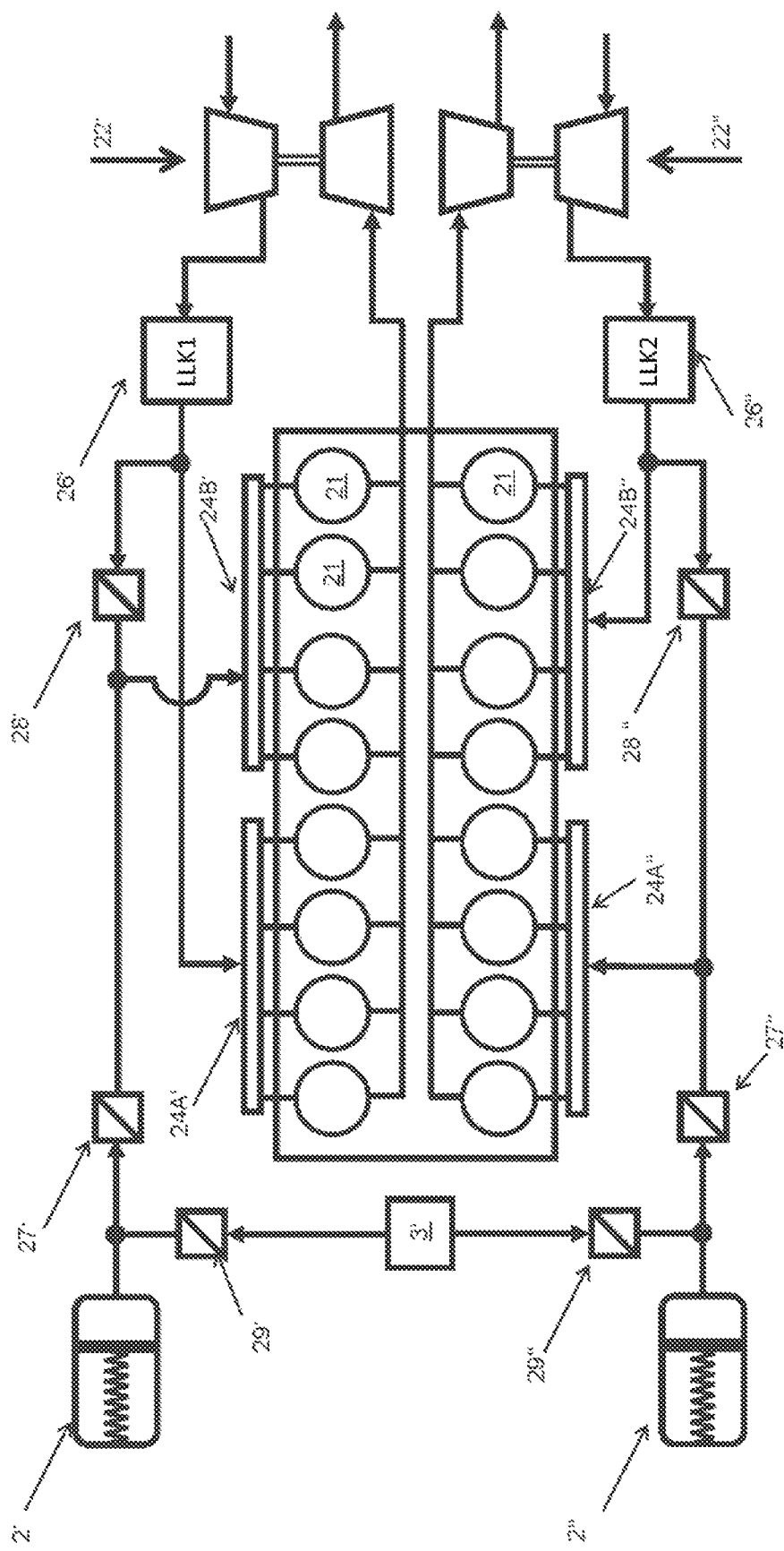
FIG. 6: shows a third exemplary embodiment of an internal combustion engine according to the disclosure.

FIG. 6 shows an embodiment of the disclosure for a V16 internal combustion engine. The internal combustion engine comprises n=8 combustion chambers 21 per cylinder bank. The illustrated system according to the disclosure now comprises exactly one device according to the disclosure per cylinder bank, i.e. a separate primary charge air path is provided per cylinder bank. The separate primary charge air paths each comprise an exhaust gas turbocharger 22', 22" as well as a charge air cooler 26', 26" in order to be able to supply charge air to the two air manifolds 24A', 24B' and 24A", 24B", respectively. Likewise, a separate compressed air reservoir 2', 2" is provided for each cylinder bank. The two devices according to the disclosure are constructed and function as shown in the embodiment from FIG. 3. A structurally possible and, at the same time, with a corresponding design, technically sensible cylinder deactivation pattern for the V16 internal combustion engine shown in FIG. 6 is illustrated in the lower schematic diagram of FIG. 5. For these reasons, a more detailed description can be omitted here. Only the second compressor 25 shown in FIG. 3 is not shown in FIG. 6. However, it would be possible to integrate a second compressor stage in each or only one of the devices shown in FIG. 6.

In the exemplary embodiment shown in FIG. 6, the two compressed air reservoirs 2', 2" can be recharged via the same air compressor 3'. The presence of two separate (independently operable) compressed air reservoirs 2', 2" can be advantageous for reasons of installation space, for example.

Figure 7:
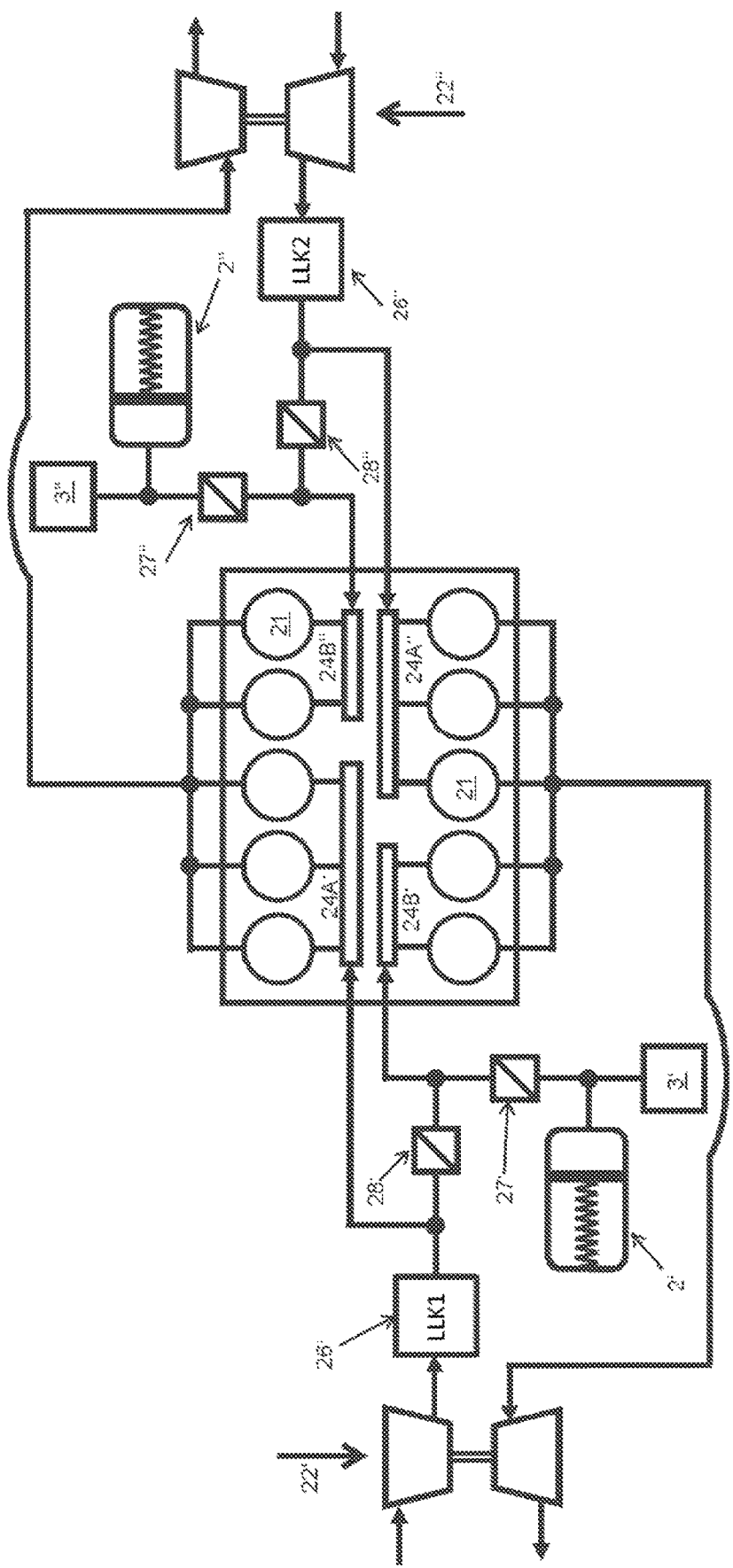
FIG. 7: shows a fourth exemplary embodiment of an internal combustion engine according to the disclosure.

FIG. 7 shows an embodiment of the disclosure for a V10 internal combustion engine comprising five combustion chambers 21 per cylinder bank and two devices according to the disclosure. However, in this exemplary embodiment, a device according to the disclosure does not serve to supply air to such combustion chambers, which are each arranged in one and the same bank. Instead, a combustion chamber group of which the air supply is provided via a shared device according to the disclosure contains combustion chambers 21 which, although locally adjacent, are arranged in two different cylinder banks.

Lastly, two comments on FIGS. 6 and 8 should not go unmentioned: In an actual implementation of a V16 internal combustion engine according to the disclosure, which is designed in accordance with FIG. 6, the air supply to the combustion chambers 21 would certainly be placed between the two cylinder banks so that the exhaust gas, due to its high temperature, can be discharged from the central region of the internal combustion engine over the shortest possible distance in each case. However, the representation chosen in FIG. 6 increases the clarity of the air paths shown in terms of circuit layout. In this respect, the circuit diagram of the V10 internal combustion engine shown in FIG. 7 is oriented rather towards an actual implementation. In this circuit diagram, the air is distributed to the various combustion chambers 21 starting from the central region, while the exhaust gas is discharged to outside the combustion engine. For the sake of clarity, however, the two air sections, each equipped with a device according to the disclosure, are drawn on two diametrical sides of the internal combustion engine in that diagram, which would clearly be less practicable in an actual set-up.

Figure 1:
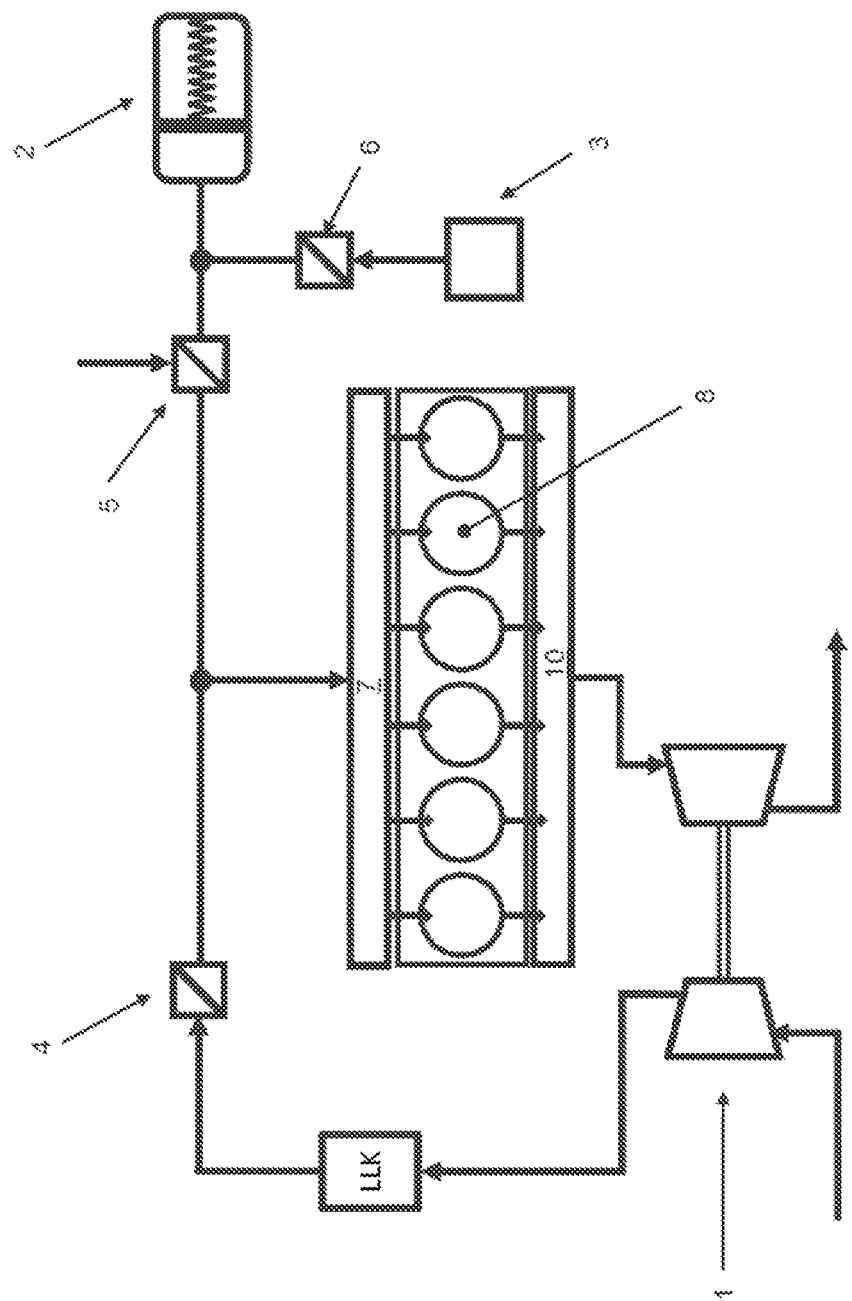
FIG. 1: shows a first exemplary embodiment of an internal combustion engine according to the prior art.

The advantages of the disclosure can be summarized again compactly below:

When the boost system according to the disclosure in FIG. 3 is actuated, air is supplied to the combustion chambers 21 simultaneously in an additively acting manner by means of the primary air path via the charge air compressor 22b of the exhaust gas turbocharger 22 and from the compressed air reservoir 2. By contrast, the prior art boost system according to FIG. 1 has a substituting effect because, during boost operation, the air supply via the regular air path is overridden.

Clearly—as already mentioned—the increased air supply to the combustion chambers during a boost operation takes place under a coordinated increase in the fuel supply volume. In the boost system according to the disclosure, the increased air supply volume resulting from an activation of the boost function is directly supplied to the combustion chambers 21. Consequently, a boost operation of an internal combustion engine according to the disclosure leads to an increased release of thermal energy within the combustion chambers 21, which is available to the exhaust gas aftertreatment system. By contrast, a prior art system according to FIG. 2, in which the compressed air which can be taken from the compressed air reservoir unit 2 is fed directly into the exhaust gas path of the internal combustion engine, leads to a very significant reduction in the exhaust gas temperature.

From the perspective of the combustion chambers, boost operation means a particularly rapid increase in the volume of the supplied fuel-air mixture, which results in an increase in the formation of nitrogen oxides. Consequently, the supply rate of the reducing agent must or would have to be significantly increased so that (almost) complete degradation of the nitrogen oxides can take place, which is mandatory for compliance with the binding exhaust emission regulations. This is not a problem if the exhaust gas temperature is sufficiently high, whereas an exhaust gas temperature that is too low must be avoided at all costs.

If, however, the exhaust gas temperature or the temperature in the exhaust gas aftertreatment system is too low for the quantity of nitrogen oxides contained in the exhaust gas, then—without taking the thermal conditions into account—a purely quantitatively sufficiently high reducing agent supply rate would by no means result in a sufficiently high conversion rate of the nitrogen oxides. Such a mode of operation would even be counter-productive in several ways. The volume of reducing agent supplied, which in any case cannot contribute to the reduction of nitrogen oxides, would cause a lowering of the already too low temperature in the exhaust gas aftertreatment system and thus trigger a further weakening of the conversion rate. Furthermore, a portion of the supplied reducing agent, which does not participate in the chemical reduction for the degradation of nitrogen oxides, adheres to the catalyst surface, which cumulatively leads to the ineffectiveness of the catalyst. Consequently, an excess of reducing agent must be avoided as far as possible, wherein the purely quantitative consideration must be supplemented with a consideration of the temperature influence.

If the temperature within the exhaust gas aftertreatment system is too low to achieve a (practically) complete reduction of nitrogen oxides, a corresponding reduction of the reducing agent supply rate is the least worst option. Nevertheless, it is not possible to comply with bindingly applicable emission regulations, which prohibits the operation of such an internal combustion engine.

Accordingly, the system according to the disclosure has the advantages and resulting advantages of the two previously known systems. Furthermore, the disadvantages and consequential disadvantages of the two already known systems do not exist in the system according to the disclosure. It should be noted that with regard to the system solution according to FIG. 1, a compressed air reservoir 2 used for this purpose must have a substantially higher storage capacity (for example using an increased reservoir volume and/or an increased pressure level) so that an increase in dynamics comparable to that of the system according to the disclosure can be achieved with this already known system. Consequently, in the embodiment according to FIG. 1, a longer period of time must be accepted until the boost function is available again or a correspondingly more complex on-board device, for example an air compressor, must be used, with which a higher air supply rate into the pressure reservoir 2 is possible and, if necessary, a higher pressure level can be generated.

Figure 2:
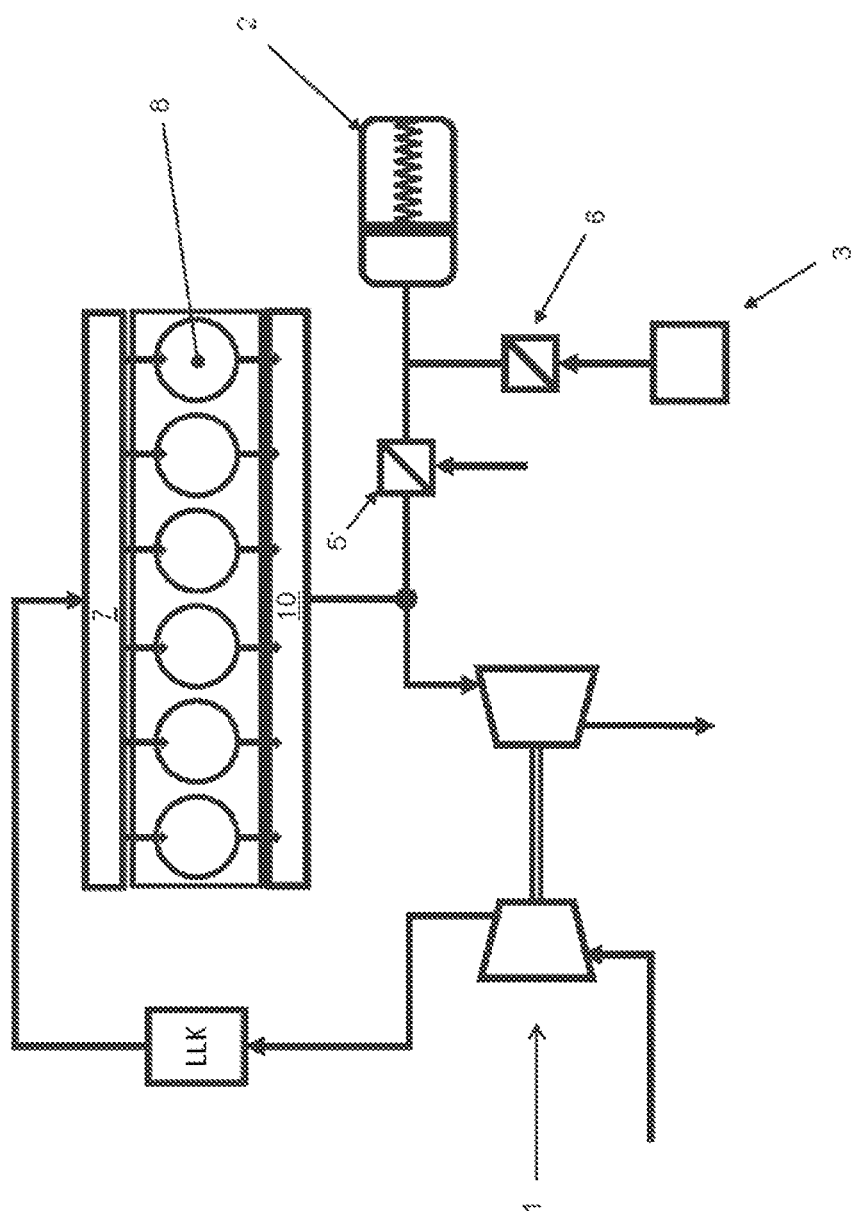
FIG. 2: shows a second exemplary embodiment of an internal combustion engine known from the prior art.

It should also be noted that, with regard to the system solution according to FIG. 2, an exhaust gas turbocharger 1 must be used which must be equipped with two turbine wheels in order to allow the boost system to be used as additively as possible. In order to ensure high availability of the boost function under the aspect of mandatory compliance with exhaust gas limits, the exhaust gas path and the compressed air path must be hermetically separated from each other. This requires an adaptation of the exhaust gas turbocharger 1, the effort for which is very high.

LIST OF REFERENCE CHARACTERS exhaust gas turbocharger 1
compressed air reservoir 2, 2', 2"
compressed air source 3, 3', 3"
switching elements 4, 5, 6
air manifold 7
combustion chamber 8
exhaust gas collector 10
combustion chamber 21
exhaust gas turbocharger 22, 22', 22"
turbine 22a
charge air compressor 22b
split 23
air manifold 24A, 24B, 24A', 24B', 24A" 24B"
charge air compressor 25
electric motor 25a
charge air cooler 26, 26', 26"
compressed air control valve 27, 27', 27", 32, 33
control interface 27a
charge air control valve 28, 28', 28", 30, 31
control interface 28a
non-return valve 29, 29', 29"
exhaust gas collector 35

The invention claimed is:

1. A device for providing combustion air in a supercharged internal combustion engine having at least one cylinder group comprising a number n of combustion chambers, wherein the device contains two or more separate air manifolds, a primary charge air path containing at least charge air compressor, and at least one compressed air reservoir, wherein a valve arrangement is provided in order to supply the two or more air manifolds selectively with combustion air through the primary charge air path or alternatively to supply only a portion of the separate air manifolds with combustion air from the primary charge air path, while (i) the entire remaining portion of the separate air manifolds or (ii) only a sub-group of the remaining portion of the separate air manifolds can be supplied with combustion air from the compressed air reservoir, wherein the device is configured to operate in a plurality of operating states, wherein, during a first operating state, all of the air manifolds are supplied with combustion air via the primary charge air path, wherein during a second operating state, only a first portion of the air manifolds are supplied with combustion air via the primary charge air path while a second portion of the air manifolds are deactivated, wherein during a third operating state, only the first portion of the air manifolds are supplied with combustion air from the primary charge air path and the second portion of the air manifolds are supplied with combustion air from the compressed air reservoir.

2. The device according to claim 1, wherein the n combustion chambers are an integral part of a cylinder bank of the internal combustion engine, wherein the n combustion chambers comprise all combustion chambers of the cylinder bank arranged in a row or only a portion of the combustion chambers of the cylinder bank arranged in a row, or the n combustion chambers are in each case arranged in opposite positions in a plurality of rows of multiple cylinder banks.

3. The device according to claim 1, wherein the device has a control unit which is configured to carry out a method, the method comprising supplying all n combustion chambers with combustion air via a primary charge air path during a first operating state; and supplying only a portion of the n combustion chambers with combustion air from the primary charge air path and another portion of the n combustion chambers with combustion air from a separate compressed air reservoir during a second operating state.

4. The device according to claim 3, wherein the compressed air reservoir is connected to at least one of the air manifolds via at least one compressed air control valve, wherein the compressed air control valve is actuatable by the control unit.

5. The device according to claim 4, wherein the primary charge air path of a combustion chamber group is permanently fluidically connected to at least one or a portion of the air manifolds and at least one charge air control valve is provided in the fluid connection to at least one other air manifold.

6. The device according to claim 5, wherein the charge air control valve is directly connected to the compressed air control valve.

7. The device according to claim 5, wherein the charge air control valve is externally actuatable or is configured as a non-return valve.

8. The device according to claim 1, wherein the compressed air reservoir is connected to a compressed air source that is separate or is already provided otherwise, and/or is connectable to the primary charge air path for supercharging the compressed air reservoir, wherein the compressed air source can be driven via a power take-off of the internal combustion engine.

9. The device according to claim 1, wherein the air stored in the compressed air reservoir is heated.

10. The device according to claim 3, wherein, during a third operating state, only those combustion chambers of the n combustion chambers that draw their combustion air from the compressed air reservoir are supplied with fuel.

* * * * *

UNITED STATES PATENT AND TRADEMARK OFFICE
CERTIFICATE OF CORRECTION

| | |
|---|---|
| PATENT NO. | : 12,085,011 B2 |
| APPLICATION NO. | : 18/060510 |
| DATED | : September 10, 2024 |
| INVENTOR(S) | : Bouzid Seba et al. |

It is certified that error appears in the above-identified patent and that said Letters Patent is hereby corrected as shown below:

On the Title Page

Column 1 Item (30) please insert:
-- Foreign Application Priority Data: Dec. 1, 2021 (CH) .............................. CH070629/2021 --

Signed and Sealed this
Twenty-second Day of October, 2024

Katherine Kelly Vidal
*Director of the United States Patent and Trademark Office*